(12) United States Patent
Barbeau et al.

(10) Patent No.: US 8,138,907 B2
(45) Date of Patent: Mar. 20, 2012

(54) TRAVEL ASSISTANT DEVICE

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 317 days.

(21) Appl. No.: 11/464,079

(22) Filed: Aug. 11, 2006

(65) Prior Publication Data

US 2007/0034107 A1 Feb. 15, 2007

Related U.S. Application Data

(60) Provisional application No. 60/707,216, filed on Aug. 11, 2005.

(51) Int. Cl.
*B60Q 1/00* (2006.01)

(52) U.S. Cl. ........ 340/457; 340/988; 340/994; 701/213; 701/201; 701/202; 701/209; 701/211

(58) Field of Classification Search ............ 340/539.13, 340/994, 932.2, 573.1, 457; 701/213, 200; 455/456.1
See application file for complete search history.

(56) References Cited

U.S. PATENT DOCUMENTS

| | | | |
|---|---|---|---|
| 6,411,899 B2 | 6/2002 | Dussell et al. | |
| 6,421,605 B1 * | 7/2002 | Steiner et al. | 701/209 |
| 7,274,299 B2 * | 9/2007 | Osman | 340/686.1 |
| 2006/0149466 A1 * | 7/2006 | Kikuchi et al. | 701/211 |
| 2006/0164259 A1 * | 7/2006 | Winkler et al. | 340/944 |
| 2006/0166679 A1 | 7/2006 | Karaoguz et al. | |
| 2006/0166703 A1 | 7/2006 | Karaoguz et al. | |
| 2006/0173618 A1 | 8/2006 | Eyer et al. | |

OTHER PUBLICATIONS

Patterson et al, "Opportunity Knoks: A system to provide cognitive assistance with transportation services", UbiComp 2004, LNCS 3205, pp. 433-450.*

Sullivan et al, Mobile architectures and prototypes to assist persons with cognitive disabilities using public transportation, Cognitive Levers Project, University of Colorado, 2001.*

(Continued)

*Primary Examiner* — Jennifer Mehmood
*Assistant Examiner* — Hongmin Fan
(74) *Attorney, Agent, or Firm* — Anton J. Hopen; Courtney M. Dunn; Smith & Hopen, P.A.

(57) ABSTRACT

A travel assistant device to help individuals use transit systems. The device is particularly suited to help individuals with special needs (i.e. physical or mental disabilities) successfully navigate the transit system through cues that are delivered through the device. In certain embodiments the device utilizes a global positioning system (GPS)-enabled cell phone. The GPS features of the cell phone enable the location of a transit rider to be identified. The wireless communication features of the device allow positional data to be transmitted from the device to a geographic information system and to one or more interested parties to track the location of the transit rider. The device can be integrated with vehicle location systems of a transit system to coordinate the transit of the transit rider. In additional aspects the system facilitates the delivery of signal, cues or other communication to the transit rider to enable the rider to safely and effectively use the transit system without the immediate presence of a guide or supervisor.

7 Claims, 4 Drawing Sheets

OTHER PUBLICATIONS

Cain, Alasdair. "Design Elements of Effective Transit Materials.", FDOT Final Report, Nov. 2004.

National Institute on Disability and Rehabilitation Research. "Survey of Income and Program Participation (SIPP)", 1997.

Humanware. "Trekker" device specification at http://www.humanware.ca/web/en/p_DA_Trekker.asp.

Braddock, Rizzolo, Thompson, Bell. "Emerging Technologies and Cognitive Disability." Running Head: Emerging Technologies, 2003.

Gerhard, Sullivan. "Human-Centered Public Transportation System for Persons with Cognitive Disabilities—Challenges and Insights for Participatory Design." Proceedings of the Participatory Design Conference, Malmo University, Sweden, 2002.

Fischer. "Distributed Cognition: A Conceptual Framework for Design-for-all," In C. Stephanidis (eds.) Proceedings of HCI International 2003, Lawrence Erlbaum Associates, Mahwah, NJ, Crete, Greece, 2003.

Fischer, Sullivan. "Mobile Architectures and Prototypes to Assist Persons with Cognitive Disabilities using Public Transportation," Cognitive Levers Project, University of Colorado, 2001.

Neff, Todd. "Project and beacon for disabled," Daily Camera, Section B, Jul. 5, 2003. http://www.agentsheets.com/about_us/pressmaterial/documents/cameraarticles2003.pdf.

Winters, P.L., Perez, R.A., Labrador, M.A., Georggi, N.L., and Barbeau, S.J. "Traveling Smart: Increasing Transit Ridership through Automated Collection (TRAC) of Individual Travel Behavior Data and Personalized Feedback." National Center for Transit Research. University of South Florida. Sep. 2005.

NextBus website. http://www.nextbus.com/wirelessConfig/internetEnabledPhones.htm.

The Austin Resource Center for Independent Living, Inc. "Effective Fixed Route Travel Training: A Collaborative Approach," Project ACTION Transportation Demonstration Project for the National Institute for Accessible Transportation, 1995.

Liao, L., Fox, D., Henry, K. Learning and Inferring Transportation Routines. Proceedings of the National Conference on Artificial Intelligence (AAAI), 2004.

Patterson, D.J., Liao, L., Gajos, K., Collier, M., Livic, N., Olson, K., Wang, S., Fox, D., and Kautz, H. Opportunity Knocks: A System to Provide Cognitive Assistance with Transportation Services. UbiComp, p. 433-450, 2004.

Non-final Office Action with Feb. 3, 2011 electronic notification date for U.S. Appl. No. 12/234,778, filed Sep. 22, 2008.

* cited by examiner

TRAVEL ASSISTANT DEVICE

CROSS REFERENCE TO RELATED APPLICATIONS

This application claims priority to currently pending U.S. Provisional Patent Application 60/707,216, entitled, "Technology to Assist Transit Riders with Special Needs", filed Aug. 11, 2005, the contents of which are herein incorporated by reference.

FIELD OF INVENTION

This invention relates to the field of global positioning systems. More specifically, this invention relates global positioning systems and wireless communication systems to provide transit system information to riders of transit systems and remotely-located caretakers of the riders.

BACKGROUND OF THE INVENTION

Public transit is becoming an increasingly important and complex means of transportation. For many individuals, public transit is their only available means of transportation. Because they cannot drive, don't have a car, or have a physical or mental disability, they must rely solely on public transportation. Many of these individuals are intimidated by the complexities of public transit, including identifying proper routes and transfer points according to schedule, and therefore remain trapped in their homes. For those with special needs, it is especially daunting to get from one location to another without any assistance, especially on their first few trips. Some of these individuals must board a bus with a stroller or wheel chair. Others have failing sight or hearing that can make it extremely difficult for them to read the bus schedule or hear the bus driver announce stops. Many of these riders have varying degrees of mental or physical disabilities that requires another person to guide them through the process.

Transit agencies now employ "travel trainers," whose sole job is to teach new riders with special needs how to successfully travel to and from a particular location using transit. Due to the amount of time required in teaching and monitoring individuals with various needs there is often an extensive waiting list for such assistance from the travel trainers. Travel trainers ride with the individual until they feel that the rider can properly navigate the transit system on their own. At that point, the travel trainer will let the person ride by themselves for the first time. The travel trainer or family members usually follow the bus by car in order to guarantee that the rider makes it safely to their intended destination. The individual usually enjoys such outings, as their destination may be a job or other location where can meet others to socialize and interact with society. However, the caretaker is usually reluctant to allow another person to supervise their loved one. For those who successfully learn to navigate the transit system, often the caretaker of the individual is reluctant to allow them to travel without any supervision, usually due to the fear that the person may become lost and unable to return home.

Using public transit can be daunting even where a rider does would not be categorized as having special needs. Navigating the transit system can be a major obstacle for attracting new riders, especially for special needs populations. A range of techniques from advertising to online trip planners to travel trainers are used by transit agencies to overcome this barrier to increase ridership. Research has found that current informational materials do not fully meet this need. According to the National Center for Transit Research (NCTR), approximately half of the general population surveyed could not successfully plan an entire trip on the fixed-route transit system using printed information materials. This situation is magnified for many of the 50 million Americans with disabilities who depend on transit as their primary means to and from school, work, doctor appointments, and other essential activities. For those with cognitive disabilities (approximately 14.2 million Americans, or 6.9% of the population), it is especially daunting to plan and execute a trip without any personal assistance from travel trainers provided by the transit agency or other group, especially on their first few trips.

Previous research in the area of using mobile devices to aid those with disabilities has been performed by a variety of institutions and companies. A product called the "Trekker" has been developed for the visually impaired. The device is a personal digital assistant (PDA) connected to a GPS device and a Braille input device[3]. This product is similar to an off-the-shelf Pocket PC-based navigation system but has been modified to allow simple communication with the visually impaired. However, this device does not allow real-time communication with the Internet and therefore does not provide tracking services or remote monitoring by a travel trainer or caretaker. Additionally, the cost of the system is high due the combination of high-cost devices. Most importantly, the device is customized for those with visual impairments, including the use of a Braille reader, and is not suitable for those with cognitive disabilities.

Communication systems allowing users of transit systems to seek out and actively retrieve, or "pull", information concerning transit system status are known in the art. For instance, websites and fixed electronic signs have been designed that allow a user to obtain desired information. These systems can be very expensive to install and maintain. While access to the website is possible from a mobile phone, it requires that users type in the web address on the internet browser on the phone, browse to their website, and then "drill-down" through several menus to select your current transit agency, route, and select from a multitude of choices. This activity can be cumbersome in the least and a major obstacle to anyone who doesn't have much time to spare or who does not have advanced knowledge of how to access the internet through their mobile phone. All transit users, including those with cognitive disabilities, would greatly benefit from a "push" notification system for information as to where the bus currently is located as well as an estimated time-until-arrival.

A method of distant observation is needed in order to give the individual their own sense of privacy and independence while providing the caretaker and travel trainer with information as to the location of the individual so immediate action can be taken if the individual becomes is in danger. If this method could be implemented in a modern device, such as a cell phone, the individual could avoid the stigma associated with specialized devices that are made specifically for the mentally or physically disabled. In turn, the traveler will feel like they are "fitting in" by carrying such a modern device while providing their loved ones with needed peace-of-mind. There is further needed a system which integrates real-time information based upon the status of the transit system to help the user and the user's guide or caretaker navigate the system as safely and effectively as possible. The present invention solves these important needs.

SUMMARY OF INVENTION

The present invention provides a travel assistant device to help individuals use transit systems. The device is particularly suited to help individuals with special needs (i.e. physical or mental disabilities) successfully navigate the transit system through cues that are delivered through the device. In certain embodiments the device utilizes a global positioning system (GPS)-enabled cell phone. The GPS features of the cell phone enable the location of a transit rider to be identified. The wireless communication features of the device allow positional data to be transmitted from the device to a geographic information system and to one or more interested parties to track the location of the transit rider. The device can be integrated with vehicle location systems of a transit system to coordinate the transit of the transit rider. In additional aspects the system facilitates the delivery of signal, cues or other communication to the transit rider to enable the rider to safely and effectively use the transit system without the immediate presence of a guide or supervisor.

According to one aspect of the present invention there is provided a travel assistant system. The system includes a geographic information systems (GIS) module, a vehicle location system (VLS) module and a travel assistant device. The VLS tracks the location of one or more transit vehicles in the transit system. The VLS module is in communication with the GIS module. The travel assistant device has a sensor module to track the location of a transit rider and a wireless communication system module. The wireless communication system module is in communication with the sensor module and the geographic information systems module. The wireless communication module provides two-way communication between the sensor module and the GIS module.

In certain embodiments of the present invention the travel assistant system includes a remote terminal in communication with the wireless communication system module and the database module. The remote terminal allows one or more persons to monitor the transit of the transit rider. In certain aspects the remote terminal is in communication using the internet.

In certain embodiments of the present invention the travel assistant system includes a database module in communication with the GIS module and the wireless communication module. The database module can store rider or transit system information. In certain advantageous embodiments the GIS database module transmits substantially real-time information on the status or location of one or more transit vehicles to the travel assistant device.

According to another aspect of the present invention a travel assistant device. The travel assistant device includes a sensor module to track the location of a transit rider, an interface module to prompt a transit rider and a wireless communication module in communication with the sensor module, the interface module and a travel assistant system. The wireless communication system module receives signals or information of interest for the transit rider from the travel assistant system and transmits the signals or information to the interface module.

In certain embodiments of the present invention the travel assistant device is in communication with one or more remote devices. The one or more remote devices facilitate communication between the transit rider and a person at a distant location. This person can be a travel trainer, caretaker, or other interested party. The wireless communication module can be connected to one or more remote devices via the internet.

In certain embodiments of the present invention the travel assistant device is adapted to receive predefined prompts from the one or more remote devices and transmit the prompts to the interface module. In certain embodiments of the present invention the interface module of the travel assistant prompts the transit rider responsive to transit system status information. The prompts can be used to cue actions from the rider such as preparing to exit the transit vehicle, signaling by the transit rider for a stop of transit vehicle, contacting a caretaker and taking action responsive to missing the transit rider's intended stop.

In certain embodiments of the present invention the interface module of the travel assistant device displays landmark images to help a transit rider identify their destination. In certain embodiments of the present invention the interface module can display directions or maps to guide a transit rider to their destination. In certain embodiments of the present invention wireless communication module of the travel assistant device is a cellular telephone.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
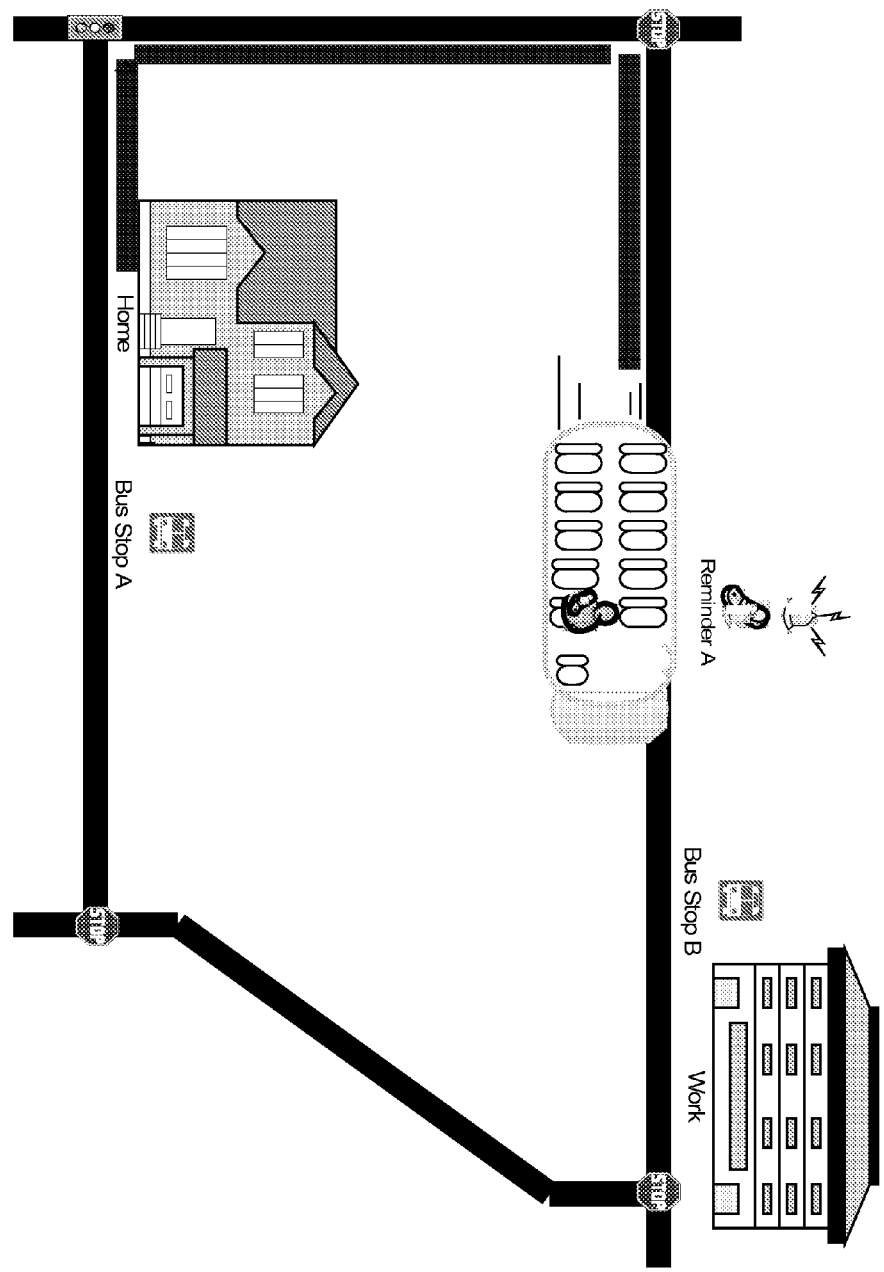
FIG. 1 is an illustration of the use of a TAD application on a mobile phone of a transit rider. The transit rider is depicted on a bus and approaching a bus stop near their place of work. The GPS feature of the mobile phone monitors the location of the user and the user is alerted when the transit riders is about to reach their stop.

This invention provides a travel assistant device (TAD) or digital travel assistant. The TAD can be used to help individuals with special needs (i.e. physical or mental disabilities) successfully navigate the transit system through cues that are delivered through a cell phone. Secondly, the caretaker or travel trainer is able to view the individual's location through an online map.

The Federal Transit Administration (FTA) recognizes that the benefits of transit such as increased mobility and reduced congestion depend on riders. Therefore, one key measure of success for transit agencies is the increase of ridership over the previous year. A prototype software application, the Travel Assistant Device (TAD), is currently under development at the Center for Urban Transportation Research (CUTR) at the University of South Florida (USF) under funding from the National Center for Transit Research (NCTR) and the Florida Department of Transportation (FDOT). TAD uses multimedia cell phones with built-in global positioning systems to overcome the challenges facing new transit riders, especially those who are cognitively disabled and tourists. This device could increase fixed route transit use among the cognitively disabled. While riders with cognitive disabilities are the initial target market for this application, TAD could be used by any traveler.

Potential benefits of the TAD include (1) increased transit ridership (2) decreased costs to the transit agency by shifting some riders from paratransit to fixed route transit, (3) increased independence and improved quality of life for transit riders and (4) increased productivity of transit agencies' "travel trainers" whose sole job is to provide one-on-one instruction for new riders or existing paratransit riders on how to use fixed-route transit.

Recent advances in mobile communications technology have created "GPS-enabled" cell phones. The GPS features of the phone will show the caretaker or travel trainer exactly where the individual is (within 15 feet) through a map shown on a web page. These devices continuously become more advanced, featuring functionality that was state-of-the-art on desktop computers just a few years ago. Not only can these cell phones tell where the individual is, but they can deliver on-demand text, sound, and video to the user of the phone. By combining the knowledge of the individual's physical location with these multimedia services, a "digital travel assistant" can be created to help guide and monitor the transit rider while they navigate the transit system. The objective of this project is to assist riders with special needs by developing a guidance system using existing mobile communication technology while assuring the rider's safety and increasing their sense of independence.

The system can use global positioning system (GPS) enabled cell phones to assist riders with special needs in using transit while enabling a travel trainer or family members to remotely monitor their progress. When deemed appropriate by the trainer, the rider can be given a cell phone to carry with them on their transit trips. If the trainer believes that a rider needs occasional guidance, a wide variety of personalized automated reminders can be delivered to the rider through the cell phone based on the rider's current physical location. Based on the assessed needs of the individual, the travel trainer will uses simple web page to set up these personalized reminders and notifications that are tailored to the specific route that the rider should take. This information could include key locations along the route and timing information that will enable the rider to successfully utilize the public transit system. A simple example may include triggering the phone to ring and vibrate when the rider should pull the stop cord in order to strive at the correct stop. Other more complex communications may include delivering an audio message from the phone that would tell the person what to do based on their current location. Other multimedia functions could also be included, such as sending the person pictures of landmarks near their intended destination or the bus number of the next bus they should board when the reach this point in their journey. For the sight or hearing-impaired, the phone's vibrate feature could alert them to a nearing stop. Automated alarms can also be triggered and the travel trainer remotely alerted in case a rider wanders off their pre-determined path.

These features will also give family members peace-of-mind and allow travel trainers to manage numerous cases more efficiently, while producing an increased sense of independence & quality of life for the rider. Travel trainers will be able to focus their attention on need-intensive individuals while maintaining a means of remote monitoring and communication with those who are nearly independent. The personalized notifications and reminders will provide simple guidance to nearly independent riders when a travel trainer is not physically present. Emergency monitoring and safety communications will be possible, enabling a trainer or concerned family members to instantly view the current location of a rider on a map through a web page or cell phone. Traditional phone communication is possible between the rider and the trainer which will allow them to guide the rider to the correct location if they are lost. More advanced information such as directions or maps based on the current location of the rider could also be accessed by the trainer or family members at any point. This system will consist of a set of GPS-enabled cell phones, a centralized database system, a web-based interface, and custom communication software to enable location-based services. This system could easily be distributed as a service for many mentally or physically disabled individuals. Transit systems would be interested in gaining a "life-long" passenger that would feel comfortable using their services. There is a strong need for this type of technology for the mentally or physically disabled whose only means of transportation is transit. Caretakers of these individuals are very interested in being able to know where they are at all times and therefore are more likely to let them experience the outside world.

Example 1

Integration of TAD with the AVL System

The Travel Assistant Device (TAD), a GPS-enabled mobile phone application, will be developed by integrating communication with an Automatic Vehicle Location (AVL) system for transit vehicles into the TAD system. The TAD software prototype uses commercially-available multimedia cell phones with built-in Global Positioning Systems (GPS) to aid new transit riders, especially those who are cognitively disabled. Informational prompts will be delivered to the rider in a "just-in-time" method that will trigger the phone to ring, vibrate or deliver an audio message when the rider should pull the stop cord and get off the bus. Automated alarms can be triggered and the travel trainer and/or parent remotely alerted in case a rider wanders off their pre-determined path.

An important feature of the design is the communication between the TAD and an AVL system. This communication will support advanced TAD features based on the real-time location of the transit vehicle in relationship to each rider's real-time location. Such features could include providing personalized notices via the rider's mobile phone estimating when the bus will reach their current position, notifying riders when their specific bus arrives, providing the rider with identifying information so that they board the correct bus if multiple buses are present, and alerting the rider and officials if the rider boards the incorrect bus.

The TAD system can be integrated with transit agencies' Automated Vehicle Location (AVL) systems. By providing the TAD system with the knowledge of the real-time location of each fixed-route transit vehicle, additional features beyond the scope of the basic, non-integrated TAD prototype become possible. These features include (1) delivering information to the rider via their mobile phone while they are waiting at the bus stop for an estimated time until arrival for their bus, (2) notifying riders when their specific bus has arrived, (3) providing the rider with identifying information so that they board the correct bus if multiple buses are present, and (4) alerting the rider and officials if the rider boards the incorrect bus.

Additionally, the integration of the two systems will serve as a model to other transit agencies for how they can make internal AVL information accessible to outside agencies using standardized methods such as XML web services. Such integration will support innovation in transit information distribution through personalized channels such as mobile phones and will also promote the use of accessible AVL data in other external systems with no additional cost to the transit agency.

A regional transit authority is currently in the design and development stage for implementation of a new AVL system and will collaborate with the TAD developers in order to make any necessary AVL data accessible to the TAD system. Since the transit authority is also participating in the development and testing of the TAD system, this unique opportunity and partnership promises to be a learning experience for both groups that could result in a model for future collaboration between such agencies. Additionally, mechanisms to access to the AVL data will be designed and developed using standardized methods such as XML web services so that in the future other outside agencies could also access the AVL data (with the transit authority's permission) without having to dissect proprietary methods of data storage and analysis. Other transit agencies have endorsed the TAD concept as well and are eager to test TAD systems when they become available.

Potential benefits of the TAD system include (1) increased transit ridership, (2) decreased costs to the transit agency by shifting some riders from paratransit to fixed route transit, (3) increased independence and improved quality of life for transit riders and (4) increased productivity of transit agencies' "travel trainers" (also called "travel instructors") whose sole job is to provide one-on-one instruction for new riders or existing paratransit riders on how to use fixed-route transit.

Potential benefits of the AVL system integration into the TAD system include (1) enhanced service to TAD riders that will support the benefits listed above, (2) design and development of an information distribution model for transit agencies so that AVL data will be accessible to outside agencies for a variety of public services without further cost to the agency or transit system, (3) innovation in the development of new methods of personalized communication of transit information to individuals through their mobile phones, and (4) promotion of investment by other public or private agencies in transit information distribution as a result of the accessible and low-cost real-time AVL information.

The TAD with AVL integration will aid individuals with cognitive disabilities, as well transit riders in general, to ride public fixed-route transit. For example, for travelers who need to journey from home to work via public transportation, multimedia alarms and reminders can be used to inform them when to board and when to deboard. FIG. 1 presents an illustration of the use of a TAD application on a mobile phone of a transit rider. The transit rider is using the transportation system, in this case a bus, to commute form home to work. The rider's location is monitored using the GPS-features of the GPS-enabled cell phone. Additionally, the location of the bus is also monitored using GPS technology. Given a unique identifier for the bus, additional features can be made available such as the route of the bus and an estimate of the time that it will arrive at a stop. As the bus and rider approach the desired stop, Bus Stop B, the phone is triggered to alert the rider. The rider can then begin to prepare to exit the bus. These notifications could take a variety of forms (depending on the specific client), such as ringing, vibrating, playing a recorded audio message and showing a picture/video of the next stop or landmark.

Figure 2:
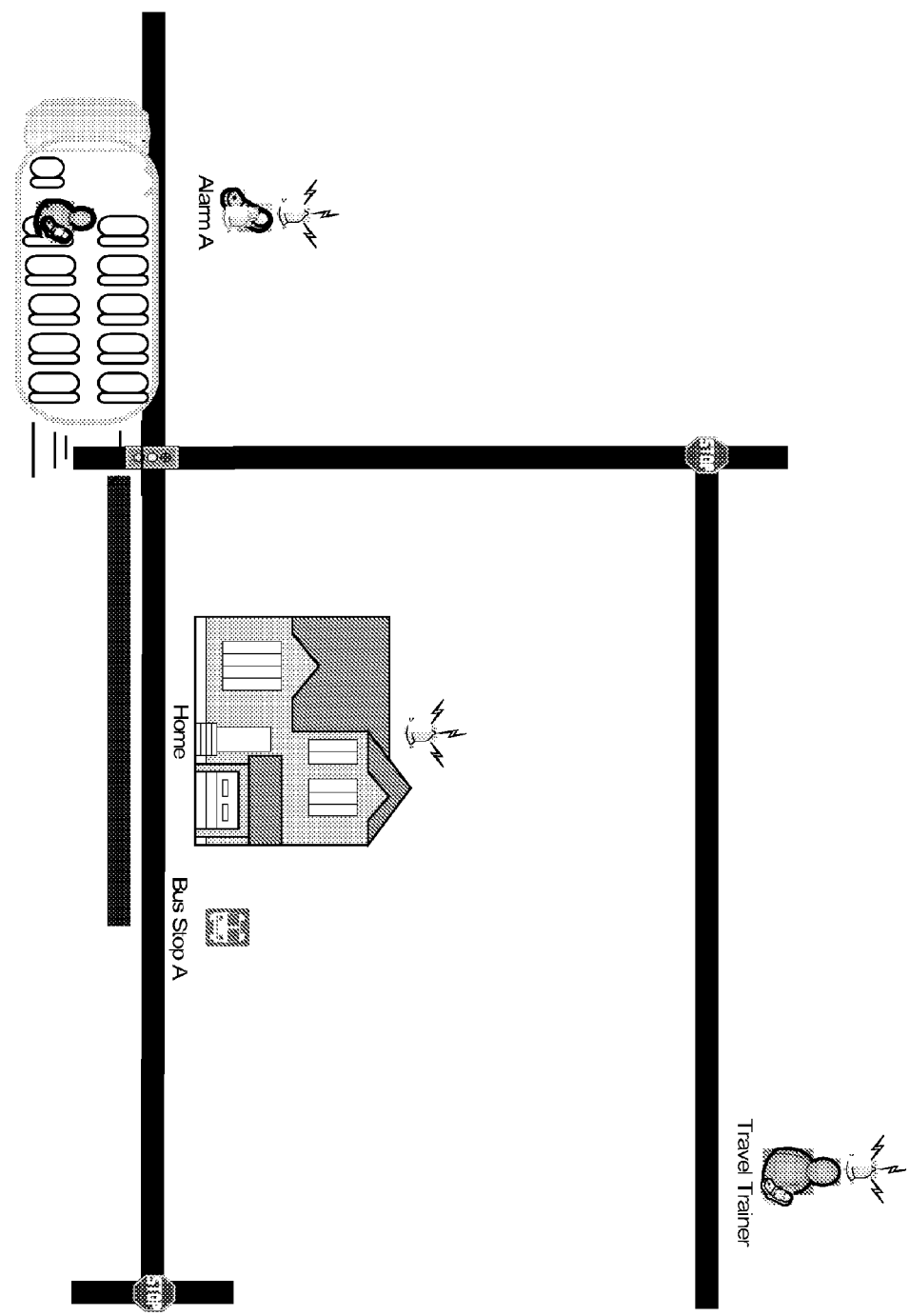
FIG. 2 is another illustration of the use of a TAD application on a mobile phone of a transit rider. The transit rider is depicted on a bus that has passed the bus stop near the transit rider's home. The GPS feature of the mobile phone monitors the location of the transit rider. An alarm is triggered when the system detects that the bus has passed the transit rider's stop. The alarm notifies the rider, the travel trainer and the caretaker that the transit rider has deviated from his or her normal route.
Figure 3:
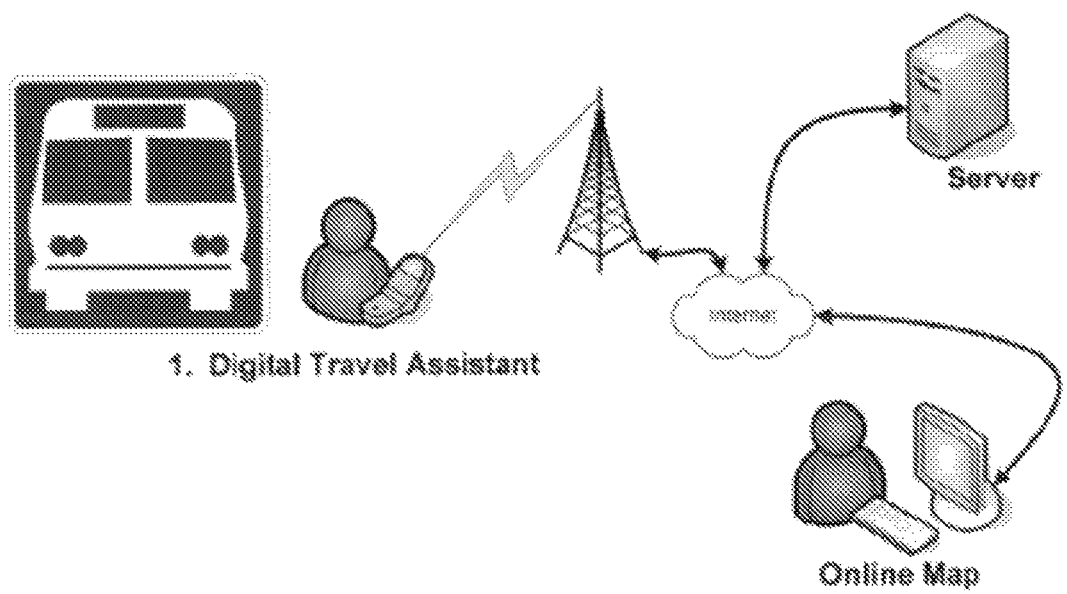
FIG. 3 is an illustration of the environment of the travel assistant device. A transit rider carries a digital travel assistant or TAD. The GPS feature of the cell phone sends location data using the cellular feature of the phone which can than be carried on the internet The location data can be transmitted to a server having GIS capabilities that can further be used to trigger cues for the rider. Additional users of the systems, such as travel trainers and caretakers, can monitor the location of the user in real-time and provide additional instructions to help the user navigate the system.
Figure 4:
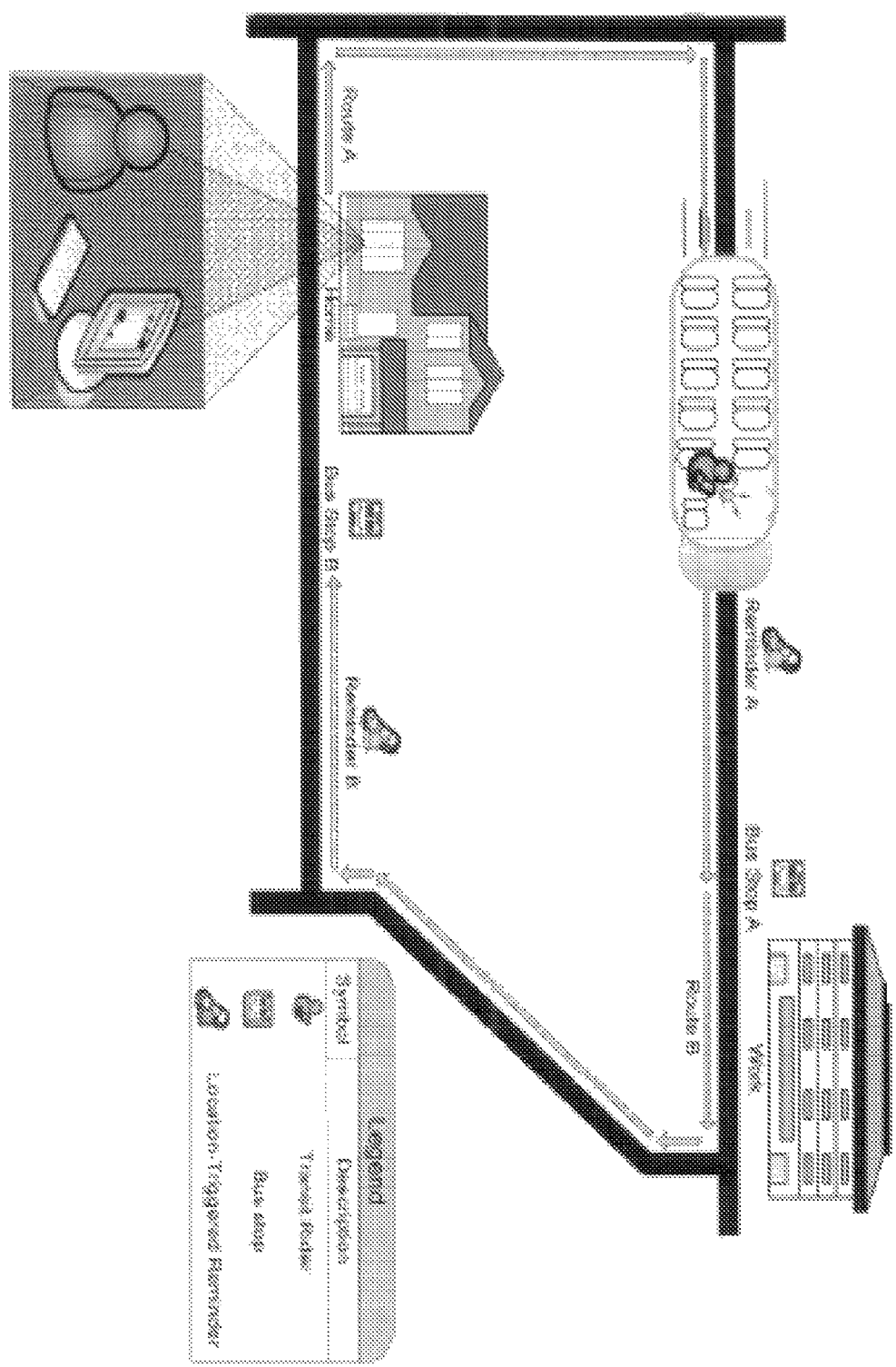
FIG. 4 is an illustration of the use of a TAD application on a mobile phone of a transit rider.

FIG. 2 presents another illustration of the use of a TAD application on a mobile phone of a transit rider. The transit rider is using the transportation system to go home. The bus that the transit rider is riding has passed the bus stop where the rider typically exits the bus on the rider's trip home. In this situation the TAD system would detect a deviation from the rider's pattern of usage. Alarms would then be triggered where the system determines that the traveler has deviated from their planned route. In addition, other people (e.g., parent or guardian, social worker, and travel trainer) could be notified of such deviation from route. The cell phone provides an easy way for these individuals to contact the traveler to advise them of what they are supposed to do next (e.g., get off at the next stop).

GPS-enabled cell phones will be used to aid transit riders. Various forms of informational prompts will be delivered to the rider in a "just-in-time" method such as triggering the phone to ring and vibrate when the rider should pull the stop cord in order to arrive at the correct stop. Other more complex communications may include delivering an audio message from the phone that would tell the person what to do based on their current location. For the sight or hearing-impaired, the phone's vibrate feature could alert them to a nearing stop. Automated alarms can also be triggered and the travel trainer remotely alerted in case a rider wanders off their pre-determined path. Traditional phone communication is possible between the rider and the trainer which will allow them to guide the rider to the correct location if they are lost. More advanced information such as directions or maps based on the current location of the rider could also be accessed by the trainer or family members at any point.

Integration with the AVL system makes additional features possible beyond the scope of the initial TAD prototype without such integration. Features, such as pushing relevant estimated-time-of-arrival information to the rider via their mobile phone while they are waiting at the bus stop, notifying riders when their specific bus has arrived, providing the rider with identifying information so that they board the correct bus if multiple buses are present, and alerting the rider and officials if the rider boards the incorrect bus become possible. These features all "push" information to the user or caretaker based on the rider's current location and require no user effort or intervention.

XML Web services and SOAP are open standards created by the World Wide Web Consortium (W3C) and are designed to facilitate communication between different businesses that have varying Information Technology (IT) infrastructures that would ordinarily be incompatible, such as Microsoft and Oracle databases. The open nature of the internet is used to transfer XML-formatted data to and from varying sources no matter what type of technology lies underneath the XML Web Service. This flexibility also extends to the mobile phone. As a result, exposing AVL data via XML Web Services would allow the creation of the real-time "push" information delivery system that is based on real-time transit information. While this technology furthers the capabilities of the TAD system, these concepts, grounded in the same personalized advertising campaigns off of which companies such as Google™ and Yahoo™ thrive, could usher in a new generation of transit users via personalized transit messages that are based on the rider's real-time location. Making AVL information accessible via standardized methods such as XML Web services also promotes innovation by outside public and commercial agencies that will be able to access real-time AVL data with little cost to themselves and create new services and products that utilize this data.

The benefits of TAD include more than increasing ridership for the transit agencies and increasing mobility and independence for the riders. The TAD will:

(1) Decrease operating costs of the transit agency by helping shift riders from paratransit to fixed route service.
(2) Increase the productivity of transit agencies' "travel trainers" by being able to assist more people. Travel trainers (also called "travel instructors") are employed by many transit agencies to provide one-on-one instruction for new riders, including those with special needs or existing paratransit riders, on how to use fixed-route transit. Travel trainers ride with the individual and teach them various navigation techniques until they feel that the rider can use the fixed-route transit system on their own.
(3) Offer more peace-of-mind for the caretaker of the rider. Often, caretakers are concerned with the safety of the transit rider and therefore are very hesitant to allow their loved one to ride fixed-route transit due to the fear that the person may become lost and unable to return home. The presence of the TAD and knowledge that the rider could be located if they were lost may encourage the caretaker to allow their loved one to ride fixed-route transit.

Travel training has shown substantial results in enabling riders to use fixed-route transit, as evidenced by Easter Seals Project ACTION studies of travel instruction programs at The Rapid transit service in Grand Rapids, Mich., Dallas Area Rapid Transit (DART) in Dallas, Tex. [12], and Capital Metropolitan Transit Authority (Capital Metro) in Austin, Tex. [13]. The Rapid showed savings of $298,252 in paratransit costs (21,550 diverted trips) in 2004 from 82 customers that were trained by one travel trainer (1 FTE). In addition, these 82 customers were able to take 8,450 more trips in 2004 than 2003 using the fixed-route transit because of the skills that they acquired while travel training. DART's total savings (after calculating the cost of staff and fixed-transit trips) were estimated at $40,445 in 2004 due to 1,092 trips diverted by their travel training staff (4 FTE). In more detailed study of Capital Metro's program, it was estimated that $50,000, was saved in paratransit costs by the diversion of 2,721 diverted trips. Additionally, 170 of the 180 participants who had never used fixed-route transit previous to the study reported using fixed-route transit for at least part of their travel needs after training, and 25 individuals completely discontinued their use of paratransit. When conducting a survey of sustained fixed-transit use, 85% of participants from a training program in the early 1990s reported the continued use of fixed-route transit one to three years after training.

Implementation of the technology will be a low cost for transit agencies. The basic system would use consumer-owned cell-phones; there would be no need for the transit agency to purchase equipment. The software could be distributed electronically over the cellular network to the clients with little deployment costs. As companies add or update AVL systems or electronic records of transit routes, the standardized communication model based off of XML Web Services could enable the integration of TAD into transit system's daily operations as well as provide this information to the public and outside public and commercial agencies.

REFERENCES

[1] Cain, Alasdair. "Design Elements of Effective Transit Information Materials", FDOT Final Report, November 2004.
[2] National Institute on Disability and Rehabilitation Research. "Survey of Income and Program Participation (SIPP)", 1997.
[3] Humanware. "Trekker" device specification at http://www.humanware.ca/web/en/p_DA_Trekker.asp
[4] Braddock, Rizzolo, Thompson, Bell. "Emerging Technologies and Cognitive Disability." Running Head: Emerging Technologies, 2003.
[5] Gerhard, Sullivan. "Human-Centered Public Transportation Systems for Persons with Cognitive Disabilities—Challenges and Insights for Participatory Design." *Proceedings of the Participatory Design Conference*, Malmo University, Sweden, 2002.
[6] Fischer. "Distributed Cognition: A Conceptual Framework for Design-for-all," In C. Stephanidis (eds.) *Proceedings of HCI International* 2003, Lawrence Erlbaum Associates, Mahwah, N.J., Crete, Greece, 2003.
[7] Fischer, Sullivan. "Mobile Architectures and Prototypes to Assist Persons with Cognitive Disabilities using Public Transportation," Cognitive Levers Project, University of Colorado, 2001.
[8] Neff, Todd. "Project a beacon for disabled", *Daily Camera*, Section B, Jul. 5, 2003. Available online at http://www.agentsheets.com/about_us/press-material/documents/Cameraarticle2003.pdf
[9] Sullivan, Kintsch. "Transportation systems and people with cognitive disabilities", Center for LifeLong Learning and Design at the University of Colorado at Boulder.
[10] Winters, Philip L.; Perez, Rafael A.; Labrador, Miguel A., Georggi, Nevine L., and Barbeau, Sean J. "Traveling Smart: Increasing Transit Ridership through Automated Collection (TRAC) Of Individual Travel Behavior Data and Personalized Feedback". National Center for Transit Research. University of South Florida. September 2005.
[11] NextBus website. http://www.nextbus.com/wireless-Config/internetEnabledPhones.htm
[12] Wolf-Branigin, Haenftling, Green. "Getting Down to Business with Bus Familiarization, Travel Instruction and Orientation and Mobility Services", February 2005.
[13] The Austin Resource Center for Independent Living, Inc. "Effective Fixed Route Travel Training: A Collaborative Approach", Project ACTION Transportation Demonstration Project for the National Institute for Accessible Transportation, 1995.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A travel assistant device comprising:
a sensor module to track the real-time location of a transit rider; a wireless communication module in communication with a transit information system, the transit information system providing the real-time location of a target transit vehicle to be ridden by transit rider to arrive to a predetermined destination location; the transit information system identifies to transit rider the target transit vehicle; and
a notification module to deliver notifications to the transit rider; wherein the device:

receives the real-time location of the target transit vehicle
compares the real-time location of the transit rider transit real-time location of the target transit vehicle, and delivers a notifications to the notification module responsive to a deviation between the real-time location of the transit rider in relation to the real-time location of the target transit vehicle the rider should be on.

2. A travel assistant device that detects improper boardings, the device comprising:
- a sensor module to track the real-time location of a transit rider;
- a wireless communication module in communication with a transit information system, the transit information system providing the real-time location of a plurality of transit vehicles accessible to the transit rider and predetermined routes each transit vehicle; and
- a notification module to deliver notifications to the transit rider, wherein the device:
  - identifies to the transit rider a target transit vehicle that will take the transit rider to a predetermined destination;
  - receives the real-time location of the target transit vehicle,
  - compares the real-time location of the transit rider and the location of the target transit vehicle;
  - delivers a notification responsive to detecting that the transit rider is on an alternate transit vehicle other than the target transit vehicle.

3. The travel assistant device of claim 2 wherein the notification is transmitted from the device to the travel rider on the alternate transit vehicle.

4. The travel assistant device of claim 2 wherein the notification is transmitted via the wireless communication module to a remote caretaker of the transit rider.

5. A travel assistant device that detects missed boarding, the device comprising:
- a sensor module to track the real-time location of a transit rider;
- a wireless communication module in communication with a transit information system, the transit information system providing the real-time location of a plurality of transit vehicles accessible to the transit rider and predetermined routes each transit vehicle; and
- a notification module to deliver notifications to the transit rider, wherein the device:
  - identifies to the transit rider a target transit vehicle that will take the transit rider to a predetermined destination;
  - identifies a predetermined boarding location for the transit rider to board the target transit vehicle;
  - receives the real-time location of the target transit vehicle;
  - compares the real-time location of the transit rider, the location of the target transit vehicle, and the predetermined route for the target transit vehicle;
  - delivers a notification responsive to a determination that the target transit vehicle has passed the anticipated boarding location for the transit rider.

6. The travel assistant device of claim 5 wherein the notification is transmitted from the device to the travel rider.

7. The travel assistant device of claim 5 wherein the notification is transmitted via the wireless communication module to a remote caretaker of the transit rider.

* * * * *